United States Patent Office 3,435,005
Patented Mar. 25, 1969

3,435,005
BRANCHED OXYMETHYLENE COPOLYMERS AND METHOD OF PREPARATION
Francis B. McAndrew, Summit, N.J., assignor to Celanese Corporation, a corporation of Delaware
No Drawing. Filed July 1, 1964, Ser. No. 379,740
Int. Cl. C08g 1/14
U.S. Cl. 260—67                     5 Claims

ABSTRACT OF THE DISCLOSURE

Disclosed herein is a description of certain alkylol-substituted oxacyclic compounds that advantageously affect the flow characteristics of oxymethylene polymers.

---

This invention relates to oxymethylene polymers and particularly to tough, high molecular weight, moldable polymers having successively recurring oxymethylene groups in the polymer chains.

Oxymethylene polymers of exceptional toughness and high molecular weight may be prepared by polymerizing a source of oxymethylene units, such as trioxane or formaldehyde. A preferred polymer may be obtained by polymerizing trioxane in the presence of boron fluoride-containing catalysts such as boron fluoride, itself, and boron fluoride coodinate complexes with organic compounds in which oxygen or sulfur is the donor atom.

Oxymethylene polymers of improved thermal stability may be prepared by introducing into the polymer chains or attaching to the ends of the polymer chains, structures which are resistant to thermal detachment. The polymers may incorporate interspersed oxyalkylene units with adjacent carbon atoms, and preferably oxyethylene units as disclosed in Patent No. 3,027,352 of Walling, Brown and Bartz. Copolymers of this type may be described as having at least one chain containing oxymethylene (—OCH$_2$—) units (usually at least 85 mol percent) interspersed with —O—R— units wherein R is a divalent radical containing at least two carbon atoms directly linked to each other and positioned in the chain between the two valences, with any substituent in the R radical being inert. Specific interspersed monomeric units which may be incorporated are those derived from lactones, carbonates, cyclic acid anhydrides or ethylenically unsaturated compounds, such as styrene, divinyl ether, vinyl acetate, vinyl methyl ketone or acrolein as disclosed by articles by Kern et al. in Angewandte Chemie 73 (6), pages 177 to 186 (Mar. 21, 1961), and Sittig, in Petroleum Refiner, volume 41, number 11, November 1962, pages 131 through 170. The polymers may be end-capped by acylation or etherification after polymerization or during polymerization by use of selected chain transfer agents. These stabilization methods are also disclosed in the Kern et al. and Sittig articles.

For some applications, it is desired to have polymers which flow readily at elevated temperatures while for other applications it is desired to have polymers which resist such flow. The melt index, which is related to molecular weight, provides an indication of the ease of flow of a polymer.

The melt index (1x) is determined by heating a sample of a polymer in a standard cylinder to a standard temperature of 190° C. and forcing it under a standard load of 2.160 kg. through a standard orifice of 0.0825 in. diameter and 0.315 in. long for a standard period and weighing the polymer passing through the orifice during this period. The results are reported in grams per 10 minutes. The test is described in detail in ASTM D–1238–57T.

The melt index (10x) is generally used when melt index values are low and is determined in an identical manner except that the standard load is increased tenfold to 21.60 kg. A high ratio of 10x melt index to melt index (10x/1x ratio) is desirable in many instances, since it indicates rigidity combined with processability at high pressures.

The preparation of relatively rigid low melt index polymers in the past has required the use of feed materials of exceptionally high purity since impurities tend to act as chain terminators in polymerizations and tend to limit the molecular weight of the polymer. The necessity for exceptionally pure feed materials is a serious process disadvantage.

In addition, the relatively rigid low melt index polymers as prepared are difficult to process in that they have an extremely narrow temperature range of processability.

It is an object of this invention to provide low melt index oxymethylene polymers of improved processability and to provide a method for preparing low melt index oxymethylene polymers which does not require feed materials of exceptionally high purity.

It is another object of this invention to provide cross-linked polymers which, after being formed in the desired shape are substantially intractable and insoluble in the common solvent systems.

In accordance with one aspect of this invention there is provided an oxymethylene copolymer containing at least 80% by weight of recurring oxymethylene groups and containing as branching structures, moieties derived from an oxacyclic compound of the following structure:

wherein $n$ is an integer from 0 to 2, $m$ is an integer from 1 to 2, $s$ is an integer from 0 to 1, $R_1$ is a member of the group consisting of hydrogen and alkyl groups containing from 1 to 10 carbon atoms, $R_2$ is an alkylene radical having from 1 to 10 carbon atoms. When $s$ is 1, the hydroxyl radical may be attached to any carbon atom in $R_1$.

The preferred method of making the oxymethylene copolymer of this invention is by the copolymerization of trioxane with an oxacyclic compound containing a single epoxide or oxetane ring and a single alkylol substituent on one carbon atom of said ring.

In a preferred embodiment of this invention the carbon atom of the oxacyclic ring which contains the alkylol substituent is a quaternary carbon which also contains an alkyl substituent, and particularly an alkyl substituent having from 1 to 10 carbon atoms.

Preferably, the copolymers of this invention contain, in addition to the oxymethylene groups and branching structures from the alkylol-substituted oxacyclic compounds described above, other monomeric units which contain at least two carbon atoms directly linked to each other, such as —O—R— units wherein R is a divalent radical containing at least two carbon atoms directly linked to each other and positioned in the chain between the two valences, with any substituent in the R radical being inert. In a preferred example the —O—R— units are oxyalkylene units with adjacent carbon atoms and particularly oxyethylene units. Such other monomeric units may be incorporated into the polymer structure by including in the polymerization reaction mixture cyclic ethers having adjacent carbon atoms, as disclosed in the above-identified U.S. Patent No. 3,027,352, or by including lactones, carbonates, cyclic acid anhydrides or ethylenically unsaturated compounds, as disclosed in the above identified Kern et al. and Sittig articles.

For the production of polymers of improved processability trioxane is copolymerized with a small amount of the alkylol-substituted oxacyclic compound, the small amount being sufficient to link some primary oxymethylene chains to provide a branched structure but insufficient to make the polymer intractable. Primary chains are linear chains comprising successively recurring oxymethylene units and are the chains which would be produced if the alkylol-substituted oxacyclic compound were omitted from the system. The amount of alkylol-substituted oxacyclic compound for the preparation of a processable polymer is generally not more than is required to provide one link to another chain for each primary chain in the system and preferably between about 0.01% and about 7% by weight, based on the total weight of monomers.

Since the polymer components are incorporated into the polymer structure during the polymerization process, the chain branching agent linking units are dispersed randomly and uniformly throughout the polymer rather than being concentrated at the surface of the polymer particles.

A preferred alkylol-substituted oxacyclic compound is trimethylolpropane oxetane [also known as 3-ethyl-3-(hydroxy methyl) oxetane], which has the following structure:

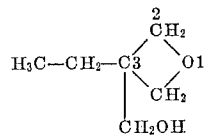

Other suitable alkylol-substituted oxacyclic compounds which may be used include trimethylolethane oxetane, 3-propyl-3(hydroxy methyl) oxetane, 3-butyl-3(hydroxy methyl) oxetane, 3-pentyl-3(hydroxy methyl) oxetane, 3-n-octyl-3(hydroxy ethyl) oxetane, 3-ethyl-3(hydroxy pentyl) oxetane, 3-hydroxy methyl oxetane, 3-ethyl-3(hydroxy propyl) oxetane, 3-ethyl-3(hydroxy butyl) oxetane, hydroxy propyl glycidyl ether, pentaerythritol-monoformal, 3,3dihydroxy ethyl oxetane, 3-ethyl-3(hydroxy ethyl) 1,5-dioxane, 3-ethyl-3(hydroxy methyl) tetramethylene oxide, etc.

While it is not desired to be bound by any particular theory of operation, it is believed that, under polymerization conditions, the trioxane ring opens to become a short chain of three oxymethylene units and the alkylol-substituted oxacyclic compound opens its ring at a carbon-oxygen bond while at the same time breaking an oxygen-hydrogen bond in its hydroxyl group to produce a moiety having three reactive positions. It is believed that the alkylol-substituted oxacyclic compound opens at the positions indicated by the arrows shown when $s=0$ for purposes of simplicity:

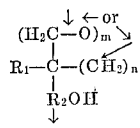

to produce the following structure:

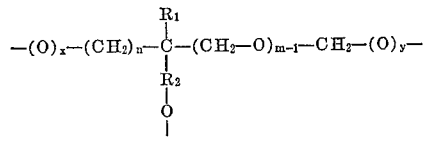

wherein $n$, $R_1$ and $R_2$ are defined as above and $x$ and $y$ are integers from 0 to 1 with $x+y=1$.

Each of the free valences in the above structure is capable of joining to chains of oxymethylene groups so that a branched structure is produced.

In the embodiment wherein a processable polymer is desired and only a small amount of alkylol-substituted oxacyclic compound is used, the product is thermoplastic and is soluble in the usual solvents for oxymethylene polymers. For example, the finely divided polymer will dissolve substantially completely in p-chlorophenol to the extent of at least 0.1 weight percent at 60° C. The polymers are also substantially completely soluble in a hydrolysis solvent containing 60 wt. percent of methanol, and 40 wt. percent of water when heated with the solvent at a polymer/solvent ratio of 100/670 by weight to a temperature of 160° C.

The preferred tractable oxymethylene copolymers and terpolymers of this invention are thermoplastic materials having a melting point of at least 150° C. and are normally millable at a temperature of 200° C. They have a number average molecular weight of at least 10.000 and have a high thermal stability. For example, if a sample of the tractable oxymethylene copolymer or terpolymer, which has been chemically stabilized as described below, is placed in an open vessel in a circulating air oven at a temperature of about 230° C. and its weight loss is measured without removal of the sample from the oven, it will have a thermal degradation rate of less than 1.0 wt. percent/minute for the first 45 minutes and, in preferred instances, less than 0.1 wt. percent/min. for the same period of time. Preferred tractable oxymethylene copolymers and terpolymers of this invention have an inherent viscosity of at least one (measured at 60° C. in a 0.1 weight percent solution in p-chlorophenol containing 2 weight percent of alpha-pinene). These preferred oxymethylene copolymers and terpolymers exhibit remarkable alkaline stability. For example, if the chemically stabilized copolymers are refluxed at a temperature of about 145° C. in a 50% solution of sodium hydroxide in water for a period of 45 minutes, the weight of the polymers will be reduced by less than 1%.

The processable polymers of this invention flow readily under pressure. The melt index of these polymers may be as low as zero gm./10 min. (no visible flow at standard test pressure) but the 10x melt index is preferably between about 10 and about 500 gm./10 min.

For the production of processible polymers, the alkylol-substituted oxacyclic compounds are usually copolymerized with the trioxane in proportions from about 0.01 to about 7 weight percent, preferably less than about 1% and most preferably from about 0.05 to about 0.80 weight percent of the chain branching agent based on the weight of trioxane.

When the alkylol-substituted oxacyclic compound and trioxane are copolymerized as the sole monomers in the system, the product is improved over the comparable polymerization product where trioxane alone is used. Such copolymers are particularly useful when end-capped by acetylation or etherification as disclosed in the Kern et al. and Sitting articles referred to above. In a preferred embodiment, terpolymers are produced containing as a third monomer component a compound, as described above, having at least two carbon atoms linked to each other.

In accordance with the preferred embodiment, the third monomeric components provide —O—R— units interspersed among the oxymethylene groups wherein —R— is a divalent radical containing at least two carbon atoms directly linked to each other and positioned in the chain between the two valences, with any substituent in the —R-radical being inert. Preferably such substituents include hydrocarbons and halohydrocarbons, which are inert with respect to formaldehyde under the conditions of polymerization.

Preferred terpolymers have chains containing (1) recurring oxymethylene groups interspersed with (2) oxyalkylene groups with adjacent carbon atoms derived from the third monomeric component (preferably a cyclic ether having adjacent carbon atoms) and (3) branch-forming groups generated from a quaternary carbon atom having three valences linked to oxyalkylene chains and having an alkyl substituent at its fourth valence.

Preferred terpolymers are those wherein the (2) oxyalkylene groups with adjacent carbon atoms are oxyethylene groups derived by opening the ring structure of cyclic ethers containing oxyethylene groups, such as ethylene oxide and 1,3 dioxolane.

Other specific cyclic ethers having adjacent carbon atoms which may be used are 1,3,5-trioxepane, 1,3-dioxane, trimethylene oxide, pentamethylene oxide, 1,2-propylene oxide, 1,2-butylene oxide, neopentyl formal, tetrahydrofurane and butadiene monoxide. Because of the fact that the inclusion of the chain branching agent produces polymers of lower melt index, terpolymers containing relatively high proportions of such cyclic ethers with adjacent carbon atoms, e.g. above about 10 weight percent, are substantially improved over comparable copolymers containing no chain branching agent.

The products of this aspect of the invention (relating to processable copolymers) generally contain at least about 80% by weight, preferably at least about 95% by weight of oxymethylene groups.

In the preferred tractable thermoplastic copolymers there is generally from about 93 to about 99.5 wt. percent of recurring oxymethylene units and from about 0.01 to about 7 wt. percent of units derived from the alkylol-substituted oxacyclic compound.

In the preferred tractable thermoplastic terpolymers there is generally from about 78 to about 99.5% by weight of recurring oxymethylene units, from about 0.5 to about 15% by weight of recurring —O—R— as described previously and from about 0.01 to about 7 wt. percent of units derived from the alkylol-substituted oxacyclic compound. The most preferred tractable terpolymers have from about 96.1 to 97.9% by weight of oxymethylene units, 2.0 to 2.9% by weight of oxyethylene units and less than about 1%, preferably between about 0.05 and 0.80% by weight, of units from the alkylol-substituted oxacyclic compound.

Any suitable catalyst suitable for the polymerization of trioxane or formaldehyde by themselves or with other materials may be used to provide the oxymethylene polymers of this invention. Preferred catalysts are cationic catalysts including such inorganic fluorine-containing catalysts as boron trifluoride, antimony trifluoride, antimony fluoroborate, bismuth trifluoride, bismuth oxyfluoride, nickelous fluoride, aluminum trifluoride, titanium tetrafluoride, manganous flouride, manganic fluoride, mercuric fluoride, silver fluoride, zinc fluoride, ammonium bifluoride, phosphorous pentafluoride, hydrogen fluoride, and compounds containing these materials such as boron fluoride coordinate complexes with organic compounds, particularly those in which oxygen or sulfur is a donor atom.

Other suitable catalysts include thionyl chloride, fluorosulfonic acid, methane sulfonic acid, phosphorus trichloride, titanium tetrachloride, ferric chloride, zirconium tetrachloride, aluminum trichloride, stannic chloride and stannous chloride.

The particularly preferred catalysts are boron fluoride and boron fluoride-containing materials such as boron fluoride monohydrate, boron fluoride dihydrate and boron fluoride trihydrate as well as boron fluoride coordinate complexes with organic compounds as mentioned previously.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex. The boron fluoride complex with diethyl ether is also very effective. Other boron fluoride complexes which may be used are the complexes with methyl acetates with ethyl acetate, with phenyl acetate, with dimethyl ether, with methyl phenyl ether and with dimethyl sulfide. Suitable catalysts are disclosed in U.S. Patents 2,989,505; 2,989,506, 2,989,507; 2,989,508; 2,989,509; all of which are by Donald E. Hudgin and Frank M. Berardinelli; 2,989,510 by George J. Bruni; and 2,989,511 by Arthur W. Schnizer. All the above patents are assigned to the same assignee as the subject application.

The catalyst, such as the boron fluoride-containing catalyst, should be present in the polymerization zone in amounts such that its boron fluoride content is between about 0.0002 and about 1.0 weight percent based on the weight of the monomers in the polymerization zone. Preferably, amounts between about 0.003 and about 0.03 weight percent should be used in continuous operation and between about 0.0002 and about 0.02% in a batch process.

The monomers in the reaction zone are preferably anhydrous or substantially anhydrous. Small amounts of moisture, such as may be present in commercial grade reactants or may be introduced by contact with atmospheric air, will not prevent polymerization, but should be removed for best yields.

In a specific embodiment of this invention, the trioxane, cyclic ether and alkylol-substituted oxacyclic compound are blended with catalyst dissolved in an anhydrous solvent such as cyclohexane and permitted to react in a sealed reaction zone while subjected to a constant shearing action. The temperature in the reaction zone may vary from about 0° C. to about 100° C. The period of reaction may vary from about 5 minutes to about 72 hours. Pressures from subatmospheric to about 100 atmospheres, or more may be used.

To reproducibly control the molecular weight of the polymer product a small amount (from about 100 to about 3000 p.p.m., based on the weight of trioxane) of a chain transfer agent, such as methylal may be included in the reaction mixture, as disclosed in U.S. Patent No. 3,337,503, issued Aug. 22, 1967 to Schnizer, Heinz and Seddon.

Upon completion of the polymerization reaction it is desirable to neutralize the activity of the polymerization catalyst since prolonged contact with the catalyst degrades the polymer. The polymerization product may be treated with an aliphatic amine, such as tri-n-butyl-amine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Patent 2,989,509.

The processable polymerization products of this invention are characterized by a high $10x$ to $1x$ melt index ratio. The $10x$ melt index is usually between about 10 and about 500 gm./10 min. The $10x/1x$ ratio is at least 25, preferably at least 30 and most preferably between about 35 and about 90. The polymer is exceptionally easily extrudable and moldable for a material of its strength properties.

The polymer also has an unusually high melt elasticity and is exceptionally suitable for blow molding, and vacuum forming. The resin tends to thicken and foreshorten in emerging from a constricted orifice. In blow molding this tendency to thicken and foreshorten in a descending parison partially counteracts the effect of gravity on the parison and makes it possible for a larger portion to be maintained without increasing internal stresses caused by the increased weight.

Melt elasticity is the percentage increase in extrudate diameter over orifice diameter when the polymer is extruded under standard test conditions. The test is conducted together with the melt index test described in ASTM D-1238-57T and is run by measuring the diameter of the melt index extrudate rod at a point ⅛″ from its outer ends and determining its percentage increase over the diameter of the orifice. The melt elasticity of the polymer of this invention is generally in excess of about 20%, e.g., above about 30%. For an oxymethylene homopolymer of comparable melt index or for a camparable copolymer containing no chain branching agents the melt elasticity is below 10%.

The polymers have high melt strength and lend themselves to processing in operations where high melt strength is advantageous. In blow molding, for example, larger bottles may be blown without difficulty. In extruding, more intricate and larger profiles may be extruded and better dimensional control may be maintained. In the extrusion of pipe, better control of surface pulsations and wall thickness may be maintained.

In a typical blow molding operation, 4-ounce Boston round bottles may be prepared using a 2″ extruder having a L/D ratio of 14/1, a die bushing I.D. of .562″, a die mandrel O.D. of .200″, a land length of 0.5″, a die temperature of 340° F., a melt temperature of 380° F., a mold temperature of 230° F. and a 20–22 second cycle.

In a typical extrusion operation, a 1″ I.D. pipe having a 0.08″ wall is extruded through a 2½″ Davis Standard extrusion machine having a die bushing of 1.200″ I.D. and a die mandrel of 1.035″ O.D. There is an external sleeve 9″ long and of 1.235″ I.D. adjacent to the die bushing and concentric with it. The sleeve controls the outer diameter of the pipe while the inner diameter is controlled by the draw rate. A temperature of 400° F. is maintained at the die and a temperature of 175° F. is maintained at the sleeve. Air pressure in the extruded pipe is maintained at 23 p.s.i.g. and pipe is taken up at a rate of 6½ ft./min.

Oxymethylene copolymers having interspersed carbon-to-carbon linkages may be stabilized by degrading the unstable end portions of the molecules consisting of successive terminal oxymethylene groups until a stable terminal group having a carbon-to-carbon linkage (e.g., an oxyethylene terminal group) is reached. The degradation may be by thermal degradation, as disclosed in U.S. Patent No. 3,103,499 by Thomas J. Dolce and Frank M. Berardinelli or by hydrolysis, as disclosed in application Ser. No. 102,097, filed by Berardinelli on Apr. 11, 1961, now abandoned. The preferred terpolymers of this invention may be stabilized by either of these methods. Stabilization by hydrolysis is preferred with the terpolymers since losses during stabilization are often less than in stabilization by heating.

The thermal degradation rate of the polymers of this invention may be reduced by the incorporation of chemical stabilizers. One suitable stabilizer system is a combination of an antioxidant ingredient such as phenolic antioxidant and most suitable a substituted bisphenol and an ingredient to inhibit chain scission, generally a compound or a polymer containing trivalent nitrogen atoms.

A suitable class of alkylene bisphenols includes compounds having from zero to 2 alkyl substituents on each benzene ring, each alkyl substituent having from 1 to 4 carbon atoms. The preferred alkylene bisphenols are 2,2′-methylene bis-(4-methyl-6-tertiary butyl phenol) and 4,4′-butylidene bis-(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amine groups, proteins, compounds having tertiary amine and terminal amide groups, compounds having amidine groups, cycloaliphatic amine compounds and aliphatic acylureas. Suitable scission inhibitors as well as suitable antioxidants and proportions are disclosed in U.S. Patent No. 3,152,101 issued Oct. 6, 1964 to Dolce; U.S. Patent No. 3,144,431 issued Aug. 11, 1964, Dolce, Berardinelli and Hudgin; application Ser. No. 838,427, now abandoned filed by Berardinelli on Sept. 8, 1959; U.S. Patent No. 3,200,090 dated Aug. 10, 1965, Dolce and Hudgin; application Ser. No. 841,690, now abandoned, filed by Kray and Dolce on Sept. 23, 1959; application Ser. No. 851,560, filed by Berardinelli, Kray and Dolce on Nov. 9, 1959; U.S. Patent No. 3,133,896 issued May 19, 1964, Dolce and Berardinelli; and U.S. Patent No. 3,156,669 issued Nov. 10, 1964 to Kray and Dolce. The disclosures of the above-mentioned applications are incorporated herein by reference.

One suitable method of incorporation of the chemical stabilizers is by blending a dry solid stabilizer into the plastic polymer while the latter is being kneaded as on heated rolls or through an extruder.

Molding powders comprising pellets of stabilized polymer may be prepared by conventional pelleting procedures such as extrusion of the polymer into cylindrical extrudates which may range in diameter from about ¹⁄₁₆″ to about ¼″ followed by chopping the extrudates into lengths which may range from about ¹⁄₁₆″ to about ¼″.

In accordance with another aspect of this invention, a cross-linked substantially intractable copolymer may be formed by copolymerizing trioxane with a larger portion of alkylol-substituted oxacyclic compound than is used in preparing the processable polymer. For this purpose, the proportion of alkylol-substituted oxacyclic compound is suitably between about 7%, preferably above about 7.1%, and about 20% by weight, based on the total monomer weight, with 80 to about 93% of oxymethylene units.

In the cross-linked copolymer, as in the processable copolymer it is preferred to include as a third monomeric component, a compound having at least two carbon atoms linked to each other. In accordance with this aspect of the invention, the cross-linked copolymers are preferably composed of from about 70% to about 98.5% by weight of oxymethylene units, from about 0.5% to about 10% by weight of —O—R— units having adjacent carbon atoms (as described above) and from about 7% to about 20% by weight of units from the alkylol-substituted oxacyclic compound.

In view of the substantially intractable nature of the cross-linked copolymer, it is desirable to form the polymeric mass into its desired shape prior to the completion of the polymerization process. The polymerization mixture may, for example, be heated and subjected to a shearing action for a limited period, sufficient to assure complete mixing, and thereafter transferred to the desired mold for shaping and for completion of the polymerization reaction.

As used in the specification and claims of the subject application, the term "oxymethylene" includes substituted oxymethylene, where these substituents are inert with respect to the materials and reactions in question, that is, the substituents are free of interfering functional groups and will not introduce undesirable reactions.

Including both tractable and intractable polymers, the preferred polymers are composed of from about 70% to about 99.5% of recurring oxymethylene units, from about 0.01% to about 20% of units derived from the alkylol substituted oxacyclic compound described above and from about zero to about 15% of the —O—R— units as described above. All percentages are by weight.

Examples I to III

Trioxane, ethylene oxide and trimethylolpropane oxetane were charged as monomers to a stainless steel sigma blade mixer in the amounts shown in Table I, below. Cyclohexane and boron trifluoride dibutyl etherate catalyst (34.4 wt. percent BF$_3$) were also charged in the proportions shown in Table I. The reactions were initiated at 65° C. and the temperatures varied during the reaction as shown in Table I.

TABLE I

| Example No. | I | II | III |
|---|---|---|---|
| Trioxane (Parts by wt.) | 100 | 100 | 100 |
| Trioxane to Cyclohexane Ratio | 20 | a 20–16 | 16 |
| Ethylene Oxide (Parts by wt.) | 2.0 | 2.0 | 2.0 |
| Trimethylolpropane Oxetane (Parts by wt.) | 0.25 | 0.50 | 0.50 |
| Catalyst Concentration (p.p.m.)[b] | 75 | 75–100 | 75 |
| Reaction Temperature Range (°C.)[c] | 65–91–27 | 65–83–30 | 65–92.5–35 |
| Time Interval—Initiation to Peak Temp. (min.) | 8.5 | 19 | 19 |
| Duration of Run (min.) | 22 | 40 | 32 |
| Yield (percent)[d] | 85 | 82 | 85 |
| Loss in Stabilization (percent)[e] | 13 | 20 | 19 |
| Melt Index (dg./min.) | 5.3 | 13.9 | 2.66 |
| 10x Melt Index (dg./min.) | 210 | 770 | 178 |
| 10x/1x Ratio | 40 | 56 | 67 |
| $K_{D\ 230}$ (wt. percent min.)[f] | 0.027 | 0.049 | 0.019 |

[a] In this run a second portion of catalyst was added to induce reaction. The catalyst was diluted with a small amount of cyclohexane, thereby lowering the trioxane to cyclohexane ratio.
[b] Based on the weight of trioxane and on the $BF_3$ content of the catalyst.
[c] Values listed correspond to initiation, peak and final temperatures.
[d] Based on total monomers charged.
[e] Stabilization was carried out by milling washed and dried polymer with cyanoguanidine (0.1%) and 2,2'-methylene bis-4-(methyl-6-tertiary butyl phenol) (0.5%) for one hour at 210° C. under a nitrogen blanket in a plastograph.
[f] Degradation rate measured in a circulating air oven at 230° C.

It is to be understood that the foregoing detailed description is given merely by way of illustration and that many variations may be made therein without departing from the spirit of this invention.

The embodiments of the invention in which an exclusive property or privilege is claimed are defined as follows:

1. An oxymethylene polymer containing
   (1) from about 70 to about 99.5 weight percent of recurring —$CH_2O$— groups;
   (2) from about 0 to about 15 weight percent of —O—R— groups, wherein R is a divalent radical containing at least 2 carbon atoms linked to each other and positioned in the polymer chain between the two valences, any substituents in said R radical being inert; and
   (3) as branching structures, from about 0.01 to about 20 weight percent of

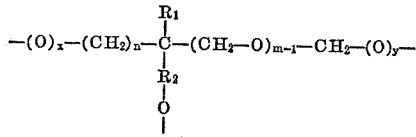

groups, wherein $n$ is an integer from 0 to 2, $m$ is an integer from 1 to 2, $R_1$ is selected from the group consisting of hydrogen and alkyl groups containing from 1 to 10 carbon atoms, $R_2$ is an alkylene radical having from 1 to 10 carbon atoms and $x$ and $y$ are integers from 0 to 1 with $x+y=1$.

2. The polymer of claim 1 wherein said —O—R— units are oxyethylene units.

3. The polymer of claim 1, wherein said

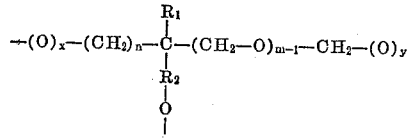

groups are derived from trimethylolpropane oxetane.

4. The polymer of claim 1, wherein said polymer is a tractable thermoplastic polymer containing from about 0.01 to less than about 1 weight percent of said

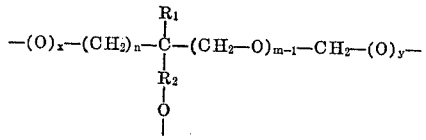

groups.

5. The polymer of claim 1, wherein said polymer is an intractable thermosetting polymer having from above 7 to about 20 weight percent of said

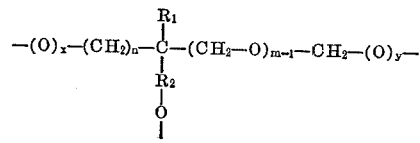

groups.

References Cited

UNITED STATES PATENTS

| 2,457,224 | 12/1948 | Gresham | 260—2 |
| 3,112,280 | 11/1963 | Farthing | 260—2 |
| 3,027,352 | 3/1962 | Walling et al. | 260—67 |
| 3,219,631 | 11/1965 | Kullmar et al. | 260—67 |
| 3,252,939 | 5/1966 | Small | 260—67 |
| 3,293,219 | 12/1966 | Gattesman et al. | 260—67 |

WILLIAM H. SHORT, *Primary Examiner.*

L. M. PHYNES, *Assistant Examiner.*

U.S. Cl. X.R.

260—45.9, 45.95